US007677684B2

(12) United States Patent
Nakayama

(10) Patent No.: US 7,677,684 B2
(45) Date of Patent: Mar. 16, 2010

(54) INK JET PRINTER, METHOD FOR CONTROLLING AN INK JET PRINTER, AND COMPUTER PROGRAM PRODUCT FOR AN INK JET PRINTER

(75) Inventor: Koji Nakayama, Seki (JP)

(73) Assignee: Brother Kogyo Kabushiki Kaisha (JP)

( * ) Notice: Subject to any disclaimer, the term of this patent is extended or adjusted under 35 U.S.C. 154(b) by 878 days.

(21) Appl. No.: 11/167,282

(22) Filed: Jun. 28, 2005

(65) Prior Publication Data

US 2005/0285894 A1 Dec. 29, 2005

(30) Foreign Application Priority Data

Jun. 28, 2004 (JP) ............................ 2004-189510

(51) Int. Cl.
*B41J 29/38* (2006.01)
*G06K 15/00* (2006.01)
*H04N 1/40* (2006.01)

(52) U.S. Cl. ............................ 347/9; 347/6; 358/1.14; 358/448

(58) Field of Classification Search .................... 347/4, 347/84, 6, 9, 35; 358/1.14, 448
See application file for complete search history.

(56) References Cited

U.S. PATENT DOCUMENTS 5,534,976 A 7/1996 Kim
2002/0196300 A1* 12/2002 Takahashi et al. ............. 347/14

FOREIGN PATENT DOCUMENTS

| | | |
|---|---|---|
| EP | 0 372 810 | 6/1990 |
| EP | 0 846 557 | 6/1998 |
| JP | 59-67767 | 4/1984 |
| JP | 01-206058 | 8/1989 |
| JP | 05-096826 | 4/1993 |
| JP | 11192729 | 7/1999 |
| JP | 2001260370 | 9/2001 |

OTHER PUBLICATIONS

European Search Report dated Jun. 16, 2006, for Application No. 05254026.7.
Partial European Search Report dated Mar. 29, 2006, for Application No. 05254026.7.

* cited by examiner

*Primary Examiner*—Matthew Luu
*Assistant Examiner*—Jannelle M Lebron
(74) *Attorney, Agent, or Firm*—Banner & Witcoff, Ltd.

(57) ABSTRACT

An ink jet printer is provided with an ink jet head that executes a printing action in which ink is discharged toward a print medium, a transportation device that transports the print medium, and a controller that controls the ink jet head to execute the printing action. The controller controls the ink jet head to execute the printing action when the ink jet printer has finished receiving a predetermined amount of print data. In a case where a time since a last printing action has exceeded a predetermined time, the controller prevents the ink jet head from executing the printing action against a partially printed print medium, and controls the transportation device to eject the print medium.

21 Claims, 8 Drawing Sheets

INK JET PRINTER, METHOD FOR CONTROLLING AN INK JET PRINTER, AND COMPUTER PROGRAM PRODUCT FOR AN INK JET PRINTER

CROSS-REFERENCE TO RELATED APPLICATION

This application claims priority to Japanese Patent Application No. 2004-189510, filed on Jun. 28, 2004, the contents of which are hereby incorporated by reference into the present application.

BACKGROUND OF THE INVENTION

1. Field of the Invention

The present invention relates to an ink jet printer, a method for controlling an ink jet printer, and a computer program product for an ink jet printer.

2. Description of the Related Art

Ink jet printers are well known. An ink jet printer receives print data files that are output from an external device such as personal computer, a digital camera, etc. The ink jet printer is provided with an ink jet head and a controller. The ink jet head executes a printing action whereby ink is discharged onto a print medium. The controller controls the ink jet head such that the content of the received print data will be printed.

In the case where a large amount of print data is contained in one print data file, it takes time for all of the print data to be received. As a result, printing takes a long time if the printing action is started when the ink jet printer has received all the print data included in the print data file. To solve this problem, the following ink jet printer has been developed. With this ink jet printer, each time the ink jet printer has finished receiving a predetermined amount of print data, this predetermined amount of print data is printed. For example, in the case where one print data file contains print data equivalent to fifty lines of a printing paper, ten lines of the print data is printed as soon as the ten lines of print data have been received. In this ink jet printer, when print data corresponding to the first ten lines has been received, the printing action of these ten lines begins. Further print data is received while this printing action is taking place. When print data corresponding to the lines 11 to 20 has been received, the printing action of these lines 11 to 20 begins. The remaining print data is printed in the same manner. In this type of ink jet printer, printing is begun before the entirety of the print data contained in the print data file has been received. Since printing is taking place at the same time as the print data is being received, the time required for printing can be reduced. This type of ink jet printer is taught in Japanese Patent Application Publication No. 05-96826.

BRIEF SUMMARY OF THE INVENTION

Communication between the ink jet printer and the external device does not always proceed smoothly. In that case, there is a long time between beginning reception of a predetermined amount of print data and completing the reception of the print data. When it takes a long time to complete reception of the predetermined amount of print data, there is a long time between completing the last printing action and restarting printing action of the predetermined amount of print data. In that case, the situation may occur in which a long period elapses between the last printing action of a print medium that has been partially printed, and the further printing action thereof. The present inventor has discovered that, in this situation, there is a change in printing quality between the portion that was partially printed earlier, and the portion that was printed subsequently. Here, 'a change in printing quality' includes both a situation where the printing quality changes only at a boundary between earlier and subsequent printing, and a situation where the printing quality has changed in the entire portion after this boundary. It is unsightly for a single print medium to have a portion in which the printing quality is different.

The problem of variation in printing quality does not occur if the ink jet printer starts to print after all the print data in one print data file has been received. However, a longer time for printing is required in this case.

The present invention sets forth a technique for preventing unsightly printing while using an ink jet printer capable of reducing printing time.

The ink jet printer taught in the present specification comprises an ink jet head, a transportation device, and a controller. The controller is capable of monitoring the time that elapses since a last printing action. In the case where the time that has elapsed exceeds a predetermined time, the controller controls the ink jet head not to continue the printing action against the print medium that has been partially printed. That is, the controller prevents the ink jet head from executing the printing action against the partially printed print medium in a case where a status the printing action is not being executed continues for the predetermined time. A further printing action against this print medium is thus prevented. When the controller prevents the printing action, the controller also controls the transportation device to eject the print medium.

With this ink jet printer, when there is no printing for a long period of a partially printed print medium, this print medium is not printed further, and the print medium is ejected instead. Unsightly printing can thus be prevented.

BRIEF DESCRIPTION OF THE DRAWINGS

FIG. 7 (*a*) shows the printing paper upstream from a location where the printing paper is entirely facing an ink discharging face of the ink jet head. FIG. 7 (*b*) shows the printing paper entirely facing the ink discharging face. FIG. 7 (*c*) shows the printing paper downstream from the location where the printing paper is entirely facing the ink discharging face.

DETAILED DESCRIPTION OF THE PREFERRED EMBODIMENT

Figure 1:
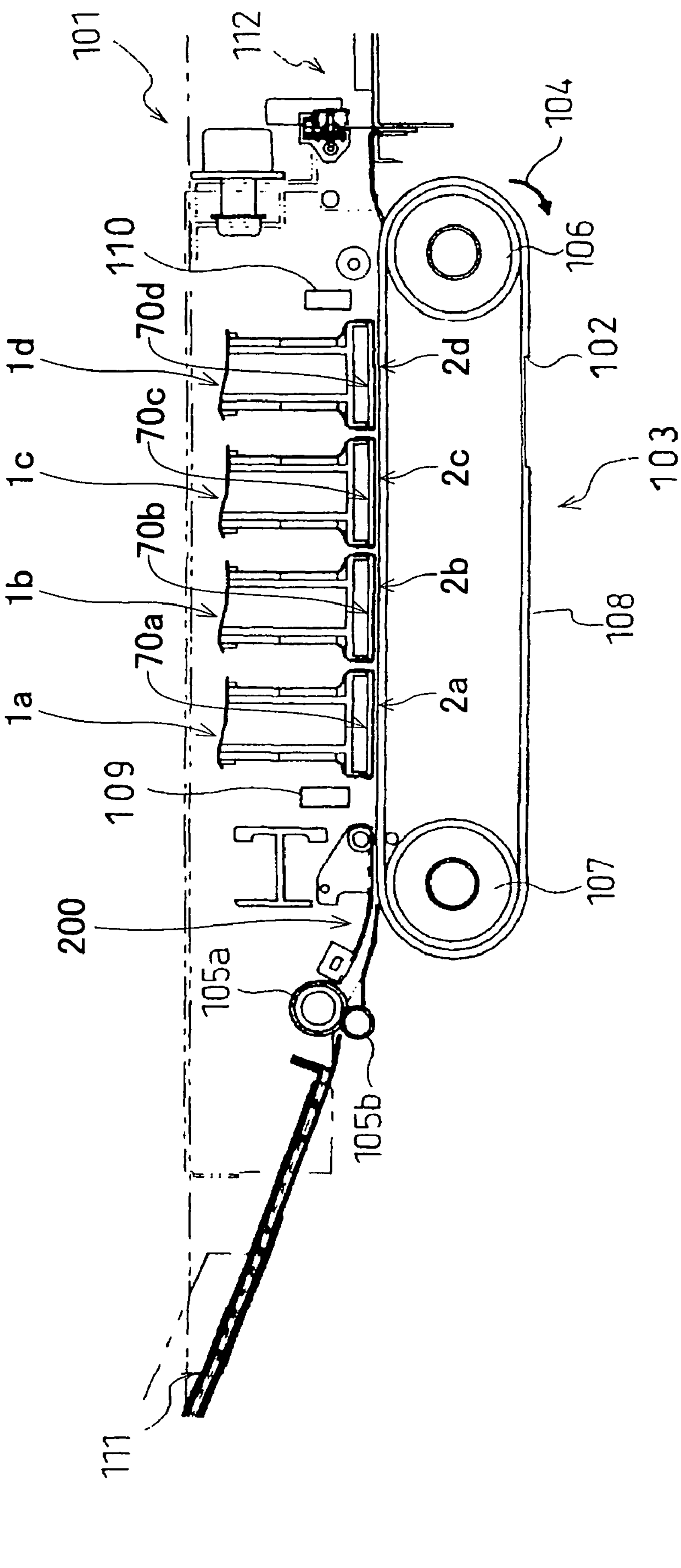
FIG. 1 shows a side view of a portion of an ink jet printer.

An ink jet printer taught in the present specification prevents further printing of a partially printed print medium in the case where a long time has elapsed since a last printing action. A situation is thus prevented in which different portions of a single print medium have different printing quality. It can be hypothesized that this change in printing quality occurs for the following reason. The following reason is a hypothesis, however, and does not limit the technical scope of the present invention. The technical scope of the present invention is construed according to the elements set forth in the claims.

In a normal ink jet printer, an ink jet head is provided with a plurality of nozzles. Each nozzle discharges ink droplets towards a print medium. A plurality of the ink droplets impact against the print medium, thus printing a desired image or letters thereon. The point at which the ink droplets impact against the print medium is termed an impact point. In the case where, for example, a color image is to be printed, different colored inks are caused to impact against the same impact point, thus causing a mixture of colors. The state of dryness of a first color ink and the extent to which the print medium is penetrated differ between a case where a second color ink has been caused to impact against the impact point of the first color ink after a short interval has elapsed, and in a case where the second color ink has been caused to impact against the impact point of the first color ink after a long interval has elapsed. There is a difference in the color mixtures of the former case and the latter case. In the case where further printing is performed with an identical color mixture, and where the first part is printed with the former circumstances and the subsequent part is printed with the latter circumstances, the color will change at a boundary between the two parts. As a result, a single print medium has a portion in which the printing quality is different.

Furthermore, the following hypothesis can also be put forward. An ink flow channel is formed in the ink jet head. When a long time has elapsed since the last printing action, the ink in the ink flow channel becomes more viscous in the vicinity of the nozzle. The printing quality changes when the viscosity of the ink changes. In this case, when printing resumes of a partially printed print medium after a long interval has elapsed, the viscosity of the ink causes a change in the printing quality at the boundary between the two parts. Further, viscous ink may be discharged in an inadequate manner. As a result, when printing resumes of a partially printed print medium after a long interval has elapsed, the entirety of the part that is printed subsequently will have a different printing quality.

Before describing the representative embodiment, characteristics of an ink jet printer of the representative embodiment will be described.

(1) The ink jet printer is provided with a timer that measures time since the completion of a last printing action.

The 'time since a last printing action' can be measured using a timer other than the aforementioned timer. For example, a timer could measure time from part way through the last printing action. Further, a timer could also measure time from beginning reception of the print data. A timer could also measure time from part way through the reception of the print data, or could measure time from having completed reception of a predetermined amount of the print data. The 'time since a last printing action' may be obtained by measuring any time that is equivalent to this time.

Further, the 'time since a last printing action' is not restricted to being measured by means of a timer. The 'time since a last printing action' may equally well be obtained by means of calculation. For example, it is possible to store the time at which the last printing action was completed, and the difference may be calculated between the completion of the last printing action and the present time.

(2) Two positioning sensors may be provided along a transportation path of the print medium. One of the sensors is provided upstream from the ink jet head, and the other sensor is provided downstream from the ink jet head. These sensors detect whether the print medium is facing the sensor.

In the case where the upstream sensor detects the print medium and the downstream sensor does not detect the print medium, it is known that the print medium is upstream from a location in which the print medium would be facing all the nozzles of the ink jet head.

In the case where the upstream sensor detects the print medium and the downstream sensor detects the print medium, it is known that the print medium is facing all the nozzles of the ink jet head.

In the case where the upstream sensor does not detect the print medium and the downstream sensor detects the print medium, it is known that the print medium is downstream from the location in which the print medium would be facing all the nozzles of the ink jet head.

(3) The ink jet head begins the printing action each time a predetermined amount of print data has been received. It is preferred that the predetermined amount is an amount of print data smaller than one page of printing of the print medium.

The predetermined amount may be fixed or variable. For example, in the case where an amount X of print data and an amount Y of print data are contained in one print data file, a first printing action may be executed when the amount X of print data has been received, and then a second printing action may be executed when the amount Y of print data has been received.

'One print data file' refers to a plurality of pieces of print data that is output as a set from an external device. The print data file is output from the external device when, for example, a predetermined operation is executed with respect to the external device. When, for example, word processing software of a PC is being used and an operation is executed to print an entire document, print data corresponding to the entire document is output as a single print data file. As another example, when an operation is executed to print only a predetermined part, print data corresponding to only that part is output as a single print data file.

(4) A belt is provided that, in its circumference direction, has a portion capable of making contact with the print medium and a portion incapable of making contact with the print medium. The belt is recessed at the latter portion. Ink is discharged towards this latter portion.

(5) The print medium is ejected by being transported to the exterior of the printer.

The method for ejecting the print medium is not limited to the aforementioned method. That is, the print medium may equally well be ejected by being transported to a predetermined receptacle within the printer. In this case, the print medium is ejected even though it has not been transported to the exterior of the printer.

EMBODIMENT

A preferred representative embodiment of the present invention will be described in detail with reference to the drawings. FIG. 1 is a side view of a portion of an ink jet printer of a representative embodiment of the present teachings. An ink jet printer 101 is a color ink jet printer. The inkjet printer 101 has four inkjet heads 1*a*, 1*b*, 1*c*, and 1*d*. The ink jet head 1*a* has an ink discharging face 2*a* at its lower face. The ink discharging face 2*a* discharges ink downwards. Similarly, the ink jet heads 1*b* to 1*d* have ink discharging faces 2*b* to 2*d* for discharging ink. The ink discharging face 2*a* has a plurality of nozzles that can print ten lines of a printing paper simultaneously. Similarly, each ink discharging face 2*b* to 2*d* has a plurality of nozzles that can print ten lines of a printing paper simultaneously. The ink jet heads 1*a* to 1*d* will be described in detail later. Further, the number 1 is used below to represent the ink jet heads 1*a* to 1*d*. Moreover, the number 2 is used to represent the ink discharging faces 2*a* to 2*d*.

The ink jet printer 101 has a paper supply part 111 and a paper ejection part 112. The paper supply part 111 is located at the left side and the paper ejection part 112 is located at the right side. Furthermore, the ink jet printer 101 is provided with a controller 60 (see FIG. 5) that controls operations of the ink jet printer 101.

A transportation path 200 is formed within the ink jet printer 101. The transportation path 200 transports printing paper from the paper supply part 111 to the paper ejection part 112. A pair of rollers 105*a* and 105*b* is disposed at the immediate downstream side of the paper supply part 111. The rollers 105*a* and 105*b* grip paper in the paper supply part 111, and deliver this paper towards the right. The rollers 105*a* and 105*b* are connected with a motor (not shown). The motor is controlled by the controller 60.

A printing paper transportation device 103 is provided at a central part of the transportation path 200. The printing paper transportation device 103 is provided with a pair of belt rollers 106 and 107, a transportation belt 108, and a motor 142 (see FIG. 5). The pair of belt rollers 106 and 107 extends parallel with a vertical direction relative to the page of FIG. 1. The belt roller 107 is located at a left side with respect to the ink jet head 2*a* (i.e. at the upstream side of the transportation path 200). The belt roller 106 is located at a right side with respect to the ink jet head 2*d* (i.e. at the downstream side of the transportation path 200).

The transportation belt 108 is wound across the belt rollers 106 and 107. When the belt rollers 106 and 107 rotate towards the right, the transportation belt 108 that is located at an upper side is transported towards the right, and the transportation belt 108 that is located at a lower side is transported towards the left. Silicon processing has been performed on an outer peripheral face of the transportation belt 108, thereby providing adhesive force on this outer peripheral face. This adhesive force allows the printing paper, which is being transported by the rollers 105*a* and 105*b*, to be maintained on the transportation belt 108. The transportation belt 108 has a double-layered structure in which two sheet shaped members have been bonded together. An inner sheet shaped member of these two sheet shaped members is formed from liquid-absorbing woven or non-woven cloth, or the like. An outer sheet shaped member of the two is formed from a rubber material. A portion 102 of the inner sheet shaped member is not covered by the outer sheet shaped member. That is, a recess 102 is formed in the outer peripheral face of the transportation belt 108. This recess 102 has a depth identical with the thickness of the outer sheet shaped member. The recess 102 receives ink that is discharged from the ink jet heads 1 when a flushing action is executed. The flushing action will be described in detail later. The recess 102 is larger than a single ink discharging face 2, thus ensuring that the ink discharged from the ink discharging face 2 will be received reliably by the recess 102. It is thus possible to prevent ink from being deposited on other locations. Further, the ink jet printer 101 is adjusted such that the printing paper that is being transported does not make contact with the recess 102.

The motor 142 is connected with the belt roller 106. This motor 142 causes the belt roller 106 to rotate. When the belt roller 106 rotates, the belt roller 107 follows this rotation.

The ink jet printer 101 is provided with positioning sensors 109 and 110. The positioning sensor 109 is provided upstream from the ink jet head 1*a*. The positioning sensor 110 is provided downstream from the ink jet head 1*d*. The positioning sensors 109 and 110 output detection signals to the controller 60 (see FIG. 5). The positioning sensor 109 outputs the detection signals while the printing paper is facing (is directly below) the positioning sensor 109, and does not output the detection signals when the printing paper is not present in that location. Similarly, the positioning sensor 110 outputs the detection signals while the printing paper is facing (is directly below) the positioning sensor 110, and does not output the detection signals when the printing paper is not present in that location. The controller 60 can determine the location of the printing paper by fetching the detection signals from the positioning sensors 109 and 110.

The controller 60 can determine the location of the printing paper in the following manner. (1) In the case where the positioning sensor 109 is outputting the detection signals and the positioning sensor 110 is not outputting the detection signals, the controller 60 can determine that an anterior end of the printing paper is passing the positioning sensor 109 and the anterior end thereof is not yet passing the positioning sensor 110. Below, this position will be termed a first position. In this first position, only some nozzles are facing the printing paper. (2) In the case where both the positioning sensors 109 and 110 are outputting the detection signals, the controller 60 can determine that the printing paper is located below both the positioning sensors 109 and 110. That is, it can determine that the printing paper is in a position facing all the ink discharging faces 2*a* to 2*d*. Below, this position will be termed a second position. (3) In the case where the positioning sensor 109 is not outputting the detection signals and the positioning sensor 110 is outputting the detection signals, the controller 60 can determine that the posterior end of the printing paper is between the positioning sensors 109 and 110. Below, this position will be termed a third position. In this third position, only some nozzles are facing the printing paper.

Next, the configuration of the ink jet heads 1*a* to 1*d* will be described. The ink jet heads 1*a* to 1*d* are fixed in a location facing the printing paper transportation device 103. The ink jet heads 1*a* to 1*d* do not move. Since each of the ink jet heads 1*a* to 1*d* has approximately the same configuration, the description below will center upon the ink jet head 1*a*.

Figure 2:
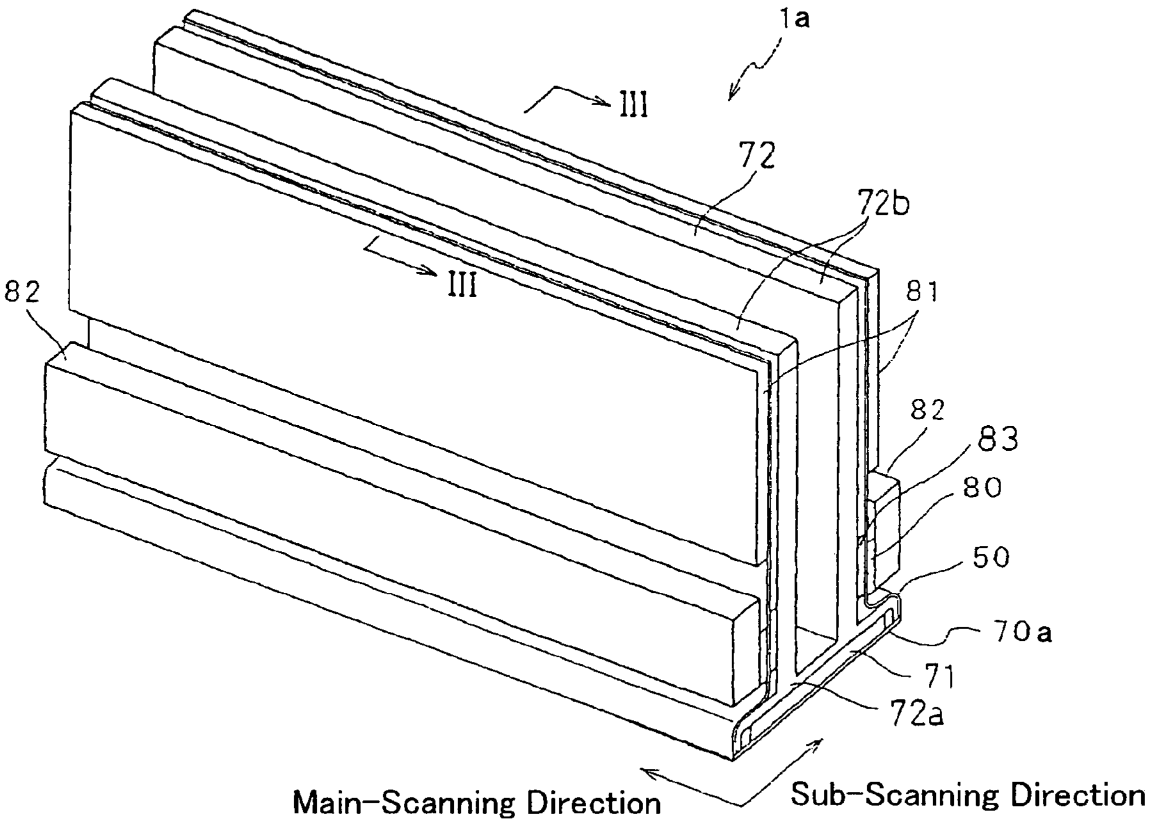
FIG. 2 shows a perspective view of an ink jet head.
Figure 3:
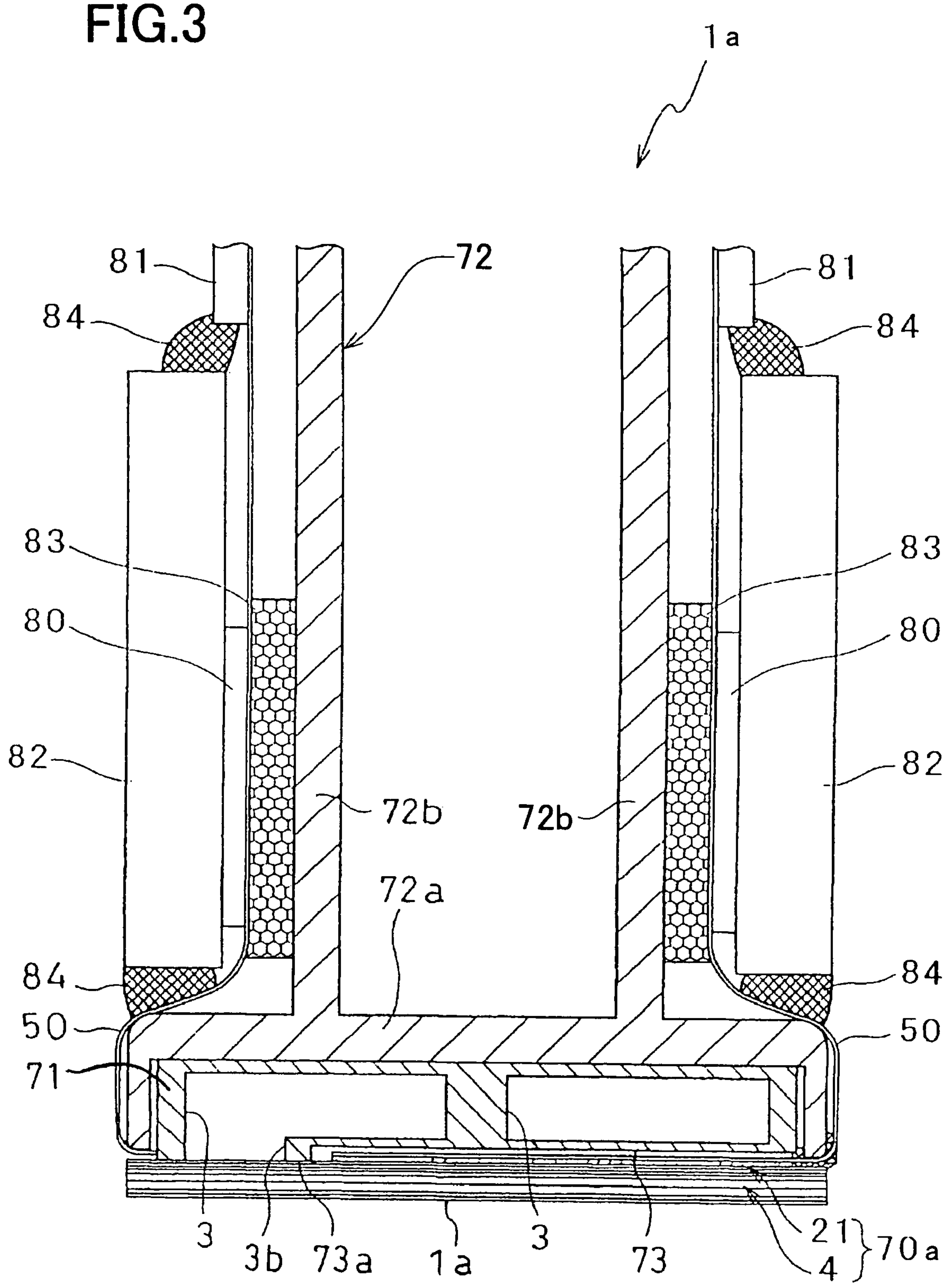
FIG. 3 shows a cross-sectional view along the line III-III of FIG. 2.

FIG. 2 is a perspective view of the ink jet head 1*a*. FIG. 3 is a cross-sectional view along the line III-III of FIG. 2. The ink jet head 1*a* is provided with a head main body 70*a*, a base block 71, etc. In FIG. 1, head main bodies of the ink jet heads 1*b* to 1*d* are shown by the numbers 70*b* to 70*d*.

From a plan view, the head main body 70 has a rectangular shape that extends in a main scanning direction. As shown in FIG. 3, the head main body 70 includes a flow channel unit 4 and an actuator unit 21. Although this is not shown, a plurality of ink flow channels is formed within the flow channel unit 4. Each ink flow channel is provided with a nozzle and a pressure chamber connected with the nozzle. The nozzles open onto a lower face in FIG. 3. The pressure chambers are filled with ink. Ink is discharged from the nozzles by changing the capacity of the pressure chambers. The flow channel unit 4 is a structure in which a plurality of thin sheets is layered and is bonded together. A detailed configuration of the flow channel unit 4 is taught in, for example, US Patent Application Publication No. 2003/0156156A1.

Figure 4:
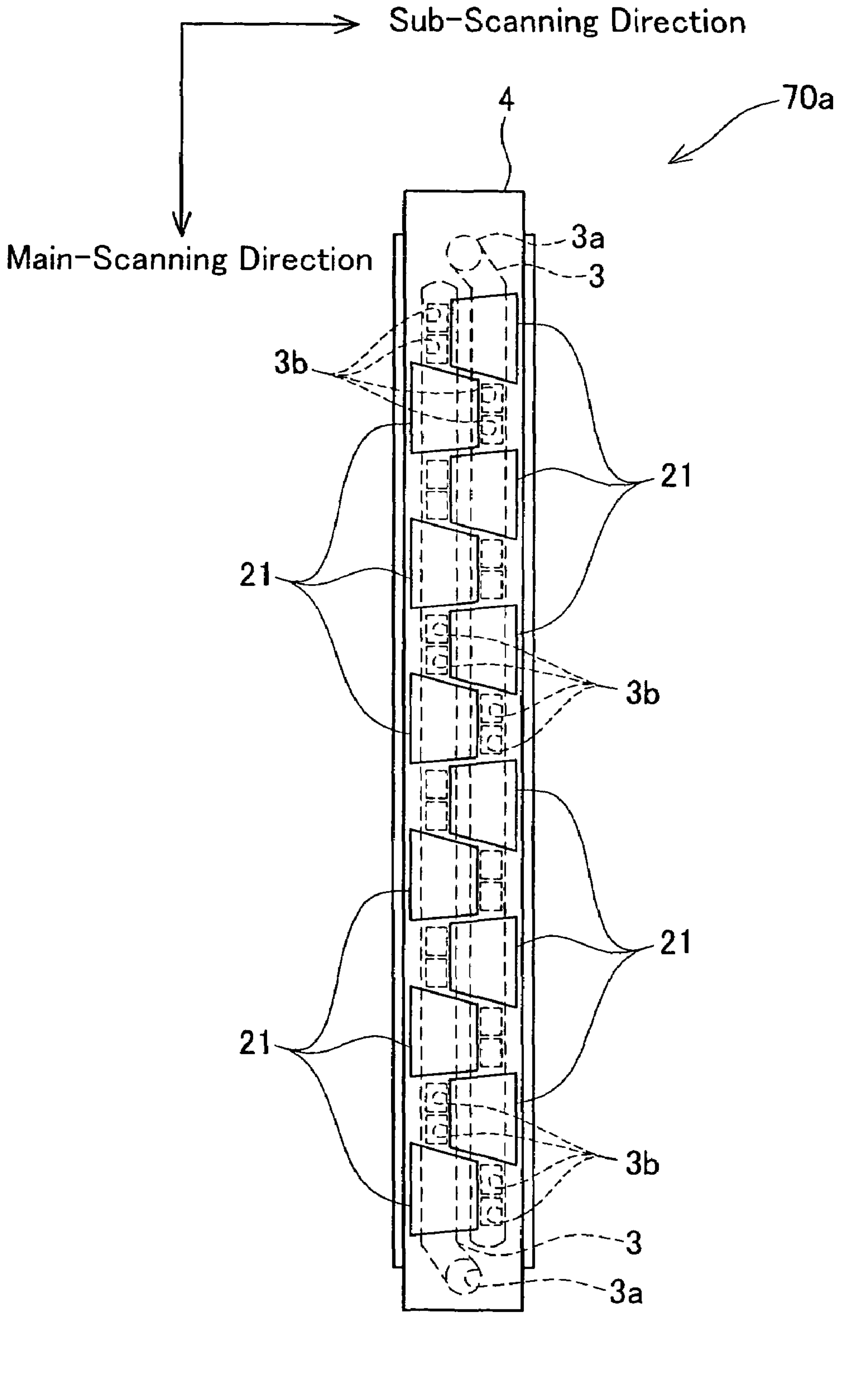
FIG. 4 shows a plan view of a head main body.

The actuator unit 21 is bonded to an upper surface of the flow channel unit 4. The ink jet head 1*a* is provided with a plurality of these actuator units 21 (this is shown in FIG. 4). Each of the actuator units 21 has a plurality of piezoelectric elements (not shown). Each of the piezoelectric elements is located in the vicinity of one of each of the pressure chambers of the flow channel unit 4. Pressure is applied to the pressure chambers when the piezoelectric elements expand, thereby applying pressure to the ink within the pressure chambers. This ink is thus discharged from the nozzles. By selecting which of the piezoelectric elements will be deformed, it is possible to cause the discharge of ink from desired nozzles. Moreover, a detailed configuration of a piezoelectric actuator is taught in US Patent No. 2003/0156156A1.

The base block 71 is disposed above the head main bodies 70. From a plan view, the base block 71 has a rectangular shape that extends in the main scanning direction. The base block 71 has two ink stores 3 for storing ink. The ink within these ink stores 3 is supplied to the head main bodies 70. The base block 71 is formed from a metal material such as, for example, stainless steel. The ink stores 3 extend in a lengthways direction of the base block 71.

An opening 3*b* is formed in a lower face 73 of the base block 71. The lower face 73 of the base block 71 has a portion 73*a* in the vicinity of the opening 3*b*. Only this portion 73*a* makes contact with the flow channel unit 4.

The ink jet head 1*a* has a holder 72, a Flexible Printed Circuit (FPC) 50, a driver IC 80, a heat sink 82, etc.

The holder 72 is disposed above the base block 71. The holder 72 has a holding member 72*a* and a pair of protrusions 72*b*. The base block 71 is fixed to the holding member 72*a* of the holder 72. The holding member 72*a* and the base block 71 are bonded by adhesive. The protrusions 72*b* extend upwards from an upper face of the holding member 72*a*.

The FPC 50 makes contact with approximately the entirety of an upper face of the actuator unit 21. Current is supplied to each of the piezoelectric elements of the actuator unit 21 via the FPC 50. The FPC 50 extends upwards along the protrusions 72*b* of the holder 72. A resilient member 83 such as a sponge is disposed between the FPC 50 and the protrusions 72*b* of the holder 72.

The driver IC 80 is disposed at an outer side of the FPC 50. The driver IC 80 is soldered to the FPC 50. The driver IC 80 supplies a driving signal (i.e. current) to the actuator unit 21 via the FPC 50.

The heat sink 82 has an approximately rectangular parallelepiped shape. The heat sink 82 fits tightly with an outer side of the driver IC 80. The heat sink 82 absorbs and dissipates heat generated by the driver IC 80.

A base plate 81 is disposed above the heat sink 82. The base plate 81 is connected with the FPC 50.

A sealing member 84 is provided between the base plate 81 and an upper face of the heat sink 82. A sealing member 84 is also provided between the FPC 50 and a lower face of the heat sink 82. These sealing members 84 prevent refuse, ink, etc. from entering the ink jet head 1*a*.

FIG. 4 is a plan view of the head main body 70*a*. In FIG. 4, the ink stores 3 within the base block 71 are shown by a broken line. The pair of ink stores 3 extends in a parallel manner in an up-down direction. The ink store 3 at the left has an opening 3*a* at a lower side. The ink store 3 at the right has an opening 3*a* at an upper side. These openings 3*a* join with an ink tank (not shown).

The ink stores 3 have a plurality of openings 3*b*. These openings 3*b* are also shown in FIG. 3. The openings 3*b* join the ink stores 3 with the flow channel unit 4. These openings 3*b* are disposed so that pairs of openings 3*b* are adjacent. The pairs of mutually adjacent openings 3*b* of the left side ink store 3, and the pairs of mutually adjacent openings 3*b* of the right side ink store 3, are disposed in a staggered pattern.

The adjacent pairs of openings 3*b* are disposed so as not to overlap, from a plan view, with the actuator units 21. The plurality of actuator units 21 is disposed in a staggered pattern. As is clear from FIG. 4, the actuator units 21 have a trapezoid shape from a plan view. There is a partial overlap in the left-right direction between the actuator units 21 that are disposed at the left side and the actuator units 21 that are disposed at the right side.

A plurality of the nozzles (not shown) is disposed in a matrix shape on a lower face (an innermost face with respect to a vertical direction relative to the page of FIG. 4) of the flow channel unit 4. These nozzles are formed in regions that, from a plan view, overlap with the actuator units 21. Nozzles are not formed in regions that do not overlap with the actuator units 21. Further, a plurality of manifolds (not shown) is formed within the flow channel unit 4. These manifolds join with the openings 3*b* of the ink stores 3. One of each of the manifolds joins with one of each the pressure chambers in the flow channel unit 4.

The ink that has been filled into the ink stores 3 flows into the manifolds via the ink openings 3*b*. The ink is thus transported from the manifolds to each of the pressure chambers, thus filling the pressure chambers with ink. When the piezoelectric element of the actuator unit 21 is expanded, thereby applying pressure to the pressure chamber, ink is discharged from the nozzle joining with that pressure chamber.

The configuration of the ink jet head 1*a* was described in detail. The other ink jet heads 1*b* to 1*d* have the same configuration as the ink jet head 1*a*, and therefore a description thereof is omitted. Further, the ink jet head 1*a* discharges cyan ink. The ink jet head 1*b* discharges magenta ink. The ink jet head 1*c* discharges yellow ink. The ink jet head 1*d* discharges black ink. Color images can therefore be printed as desired on the printing paper.

As shown in FIG. 1, the ink jet heads 1 extend in a vertical direction with respect to a direction of transportation of the printing paper (a vertical direction with respect to the page of FIG. 1). The transverse width of the ink jet heads 1 (the width in the vertical direction with respect to the page of FIG. 1) is greater than the transverse width of the printing paper. The printer 101 is a line type printer.

The printing paper is transported towards the right, and therefore faces the ink discharging faces 2*a* to 2*d* in sequence. Ink is discharged from the ink discharging faces 2*a* to 2*d* onto the printing paper that is being transported. Letters or images are thus printed onto the printing paper.

Figure 5:
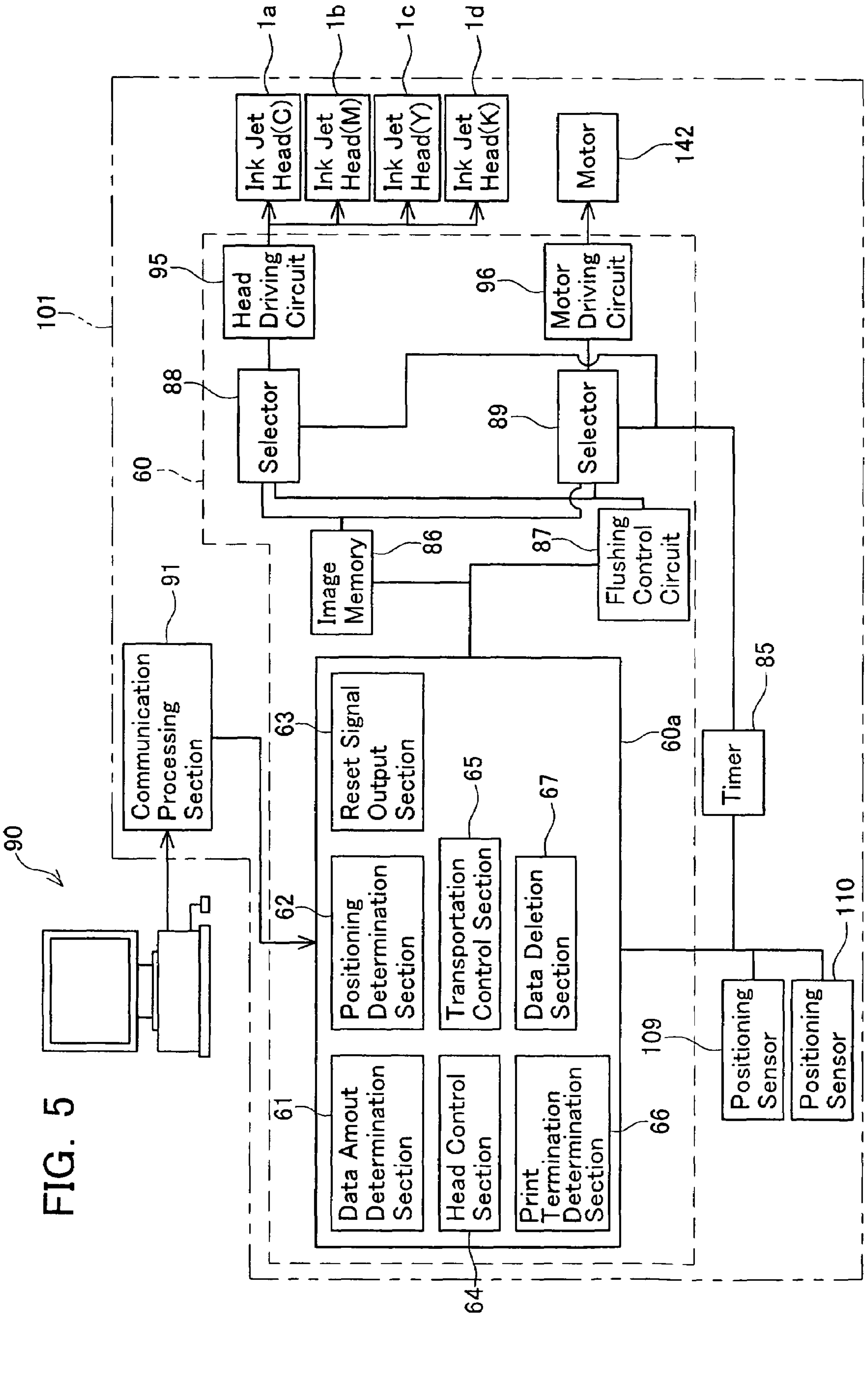
FIG. 5 shows a schematic block view of a control structure of the ink jet printer.

Next, a control structure of the ink jet printer 101 will be described with reference to FIG. 5. FIG. 5 is a schematic block view of a control structure of the ink jet printer 101.

The ink jet printer 101 has a communication processing section 91. The communication processing section 91 is connected with a PC (personal computer) 90. The communication processing section 91 receives print data files output from the PC 90. The ink jet printer 101 prints the printing paper in accordance with the content of the print data.

The communication processing section 91 is connected with the controller 60. The controller 60 has a main control section 60*a*, an image memory 86, a flushing control circuit 87, selectors 88 and 89, a head driving circuit 95, a motor driving circuit 96, etc. The controller 60 is provided with a CPU (Central Processing Unit), a ROM (Read Only Memory), and a RAM (Random Access Memory) (these are not shown). The CPU executes various processes. The ROM stores control programs to be executed by the CPU, and stores data used in the execution of these control programs. The RAM temporarily stores data generated by various processes.

The main control section 60*a* has a data amount determination section 61, a positioning determination section 62, a reset signal output section 63, a head control section 64, a transportation control section 65, a print termination determination section 66, and a data deletion section 67, these being constituted by the CPU, the ROM, and the RAM. The specific functions of these sections will be described later.

The positioning sensors 109 and 110 and a timer 85 are connected with the main control section 60*a*. The positioning sensors 109 and 110 and the timer 85 are disposed to the exterior of the controller 60.

The positioning sensors 109 and 110 output the detection signals to the main control section 60*a* while they are detecting the printing paper.

The timer 85 starts, resets, or restarts based on signals output from the reset signal output section 63. The selectors 88 and 89 are connected with the timer 85. Time measured by the timer 85 is input to the selectors 88 and 89. The selector 88 outputs a signal to the head driving circuit 95 when the time measured by the timer 85 exceeds a predetermined time. The head driving circuit 95 drives the ink jet heads 1*a* to 1*d*. The selector 89 outputs a signal to the motor driving circuit 96 when the time measured by the timer 85 exceeds the predetermined time. The motor driving circuit 96 drives the motor 142.

The main control section 60*a* is connected with the image memory 86 and the flushing control circuit 87. The image memory 86 and the flushing control circuit 87 are disposed within the controller 60.

The image memory 86 stores the print data received by the communication processing section 91. The print data received by the communication processing section 91 is stored in the image memory 86 via the main control section 60*a*.

The flushing control circuit 87 controls, via the selectors 88 and 89, the head driving circuit 95 and the motor driving circuit 96 to perform the flushing action (to be described).

The image memory 86 and the flushing control circuit 87 are connected with the selectors 88 and 89. The selector 88 is set so that, in the case where the time measured by the timer 85 has not reached the predetermined time, the selector 88 outputs the print data stored in the image memory 86 to the head driving circuit 95. The head driving circuit 95 can thus drive the ink jet heads 1 to execute the printing action in accordance with this print data. The selector 88 is set so that, in the case where the time measured by the timer 85 has reached the predetermined time, the selector 88 outputs flushing data supplied from the flushing control circuit 87 to the head driving circuit 95. The head driving circuit 95 can thus drive the ink jet heads 1 to execute the flushing action.

In the case where the time measured by the timer 85 has not reached the predetermined time, the selector 89 can output the print data stored in the image memory 86 to the motor driving circuit 96. The motor driving circuit 96 can thus drive the motor 142 to transport the printing paper in accordance with this print data. The selector 89 is set so that, in the case where the time measured by the timer 85 has reached the predetermined time, the selector 89 outputs the flushing data supplied from the flushing control circuit 87 to the motor driving circuit 96. The motor driving circuit 96 can thus drive the motor 142 to execute the flushing action.

Next, the functions of the sections 61, 62. etc. of the main control section 60*a* will be described.

The data amount determination section 61 determines whether the print data received by the communication processing section 91 has reached an amount of data corresponding to ten lines of the printing paper.

The positioning determination section 62 determines the position of the printing paper based on the results detected by the positioning sensors 109 and 110. The positioning determination section 62 determines whether the printing paper is in the first, second, or third position.

The reset signal output section 63 outputs a signal to the timer 85. The reset signal output section 63 outputs, for example, a reset signal to the timer 85 every time that ten lines of printing have been completed. The value measured by the timer 85 is thus reset to zero, and the timer 85 restarts. Further, the reset signal output section 63 may equally well output a signal to the selectors 88 and 89 to nullify the determination of these selectors 88 and 89 (i.e. the determination that the time measured by the timer 85 has exceeded the predetermined time).

The head control section 64 controls the head driving circuit 95 via the selector 88. The head control section 64 controls the head driving circuit 95 when the ink jet heads 1 are being driven in conditions where the flushing action is not to be executed. The control for the flushing action is executed by the flushing control circuit 87.

The transportation control section 65 controls the motor driving circuit 96 via the selector 89. The transportation control section 65 controls the motor driving circuit 96 when the printing paper is being transported in conditions where the flushing action is not to be executed. The control for the flushing action is executed by the flushing control circuit 87.

The print termination determination section 66 determines whether printing that corresponds to one printing page has been completed. In the present representative embodiment, an amount of data corresponding to fifty lines has been adopted as the quantity of print data of one printing page.

When the print termination determination section 66 has determined that the printing of print data corresponding to one printing page has been completed, the data deletion section 67 deletes the print data corresponding to the fifty lines that is being stored in the image memory 86. Otherwise, the data deletion section 67 may delete all the print data include in the single print data file that is being stored in the image memory 86 in the case where all of the print data have been printed.

The positioning sensors 109 and 110 are used in the present representative embodiment. However, it is instead possible to use an encoder that counts the number of rotations of the belt roller 106 or the motor 142. This encoder is disposed close to a rotary shaft of the belt roller 106 or the motor 142. The encoder counts the number of rotations of the belt roller 106 or the motor 142, and outputs this count number to the selectors 88 and 89. In this case, the selectors 88 and 89 are configured such that they use the count number from the encoder to determine whether the printing paper is in the first, second, or third position. With this configuration, the positioning sensors 109 and 110 are not required, and consequently the configuration of the ink jet printer can be simplified. Manufacturing costs can therefore be reduced.

Next, the operation of the ink jet printer 101 will be described with reference to FIG. 6. The ink jet printer 101 follows control programs so that the controller 60 controls hardware. In the present representative embodiment, the description is given using an example in which one print data file output from the PC 90 contains print data corresponding to one page of printing paper (i.e. fifty lines).

In the present representative embodiment, each of the ink jet heads 1*a* to 1*d* has nozzles corresponding to ten lines. Each of the ink jet heads 1*a* to 1*d* is capable of simultaneously printing ten lines of print data.

The ink jet printer 101 receives the print data file output from the PC 90 (S1). This print data file contains print data corresponding to fifty lines of printing. The communication processing section 91 outputs this received print data to the main control section 60*a*. The print data that has been output from the communication processing section 91 is input to the main control section 60*a*. The main control section 60*a* stores this print data in the image memory 86.

In S2, it is determined whether paper feeding has been completed. In this process, the determination is YES when either or both the positioning sensors 109 and 110 are outputting the detection signals. The determination is NO when the detection signals are not being output from either the positioning sensor 109 or the positioning sensor 110. In S2, it is determined whether no lines have yet been printed (NO), or whether printing is already taking place (YES).

In the case where NO is determined in S2, the process proceeds to S3. Flushing is performed in S3. Determining NO in S2 refers to not even one line of the printing paper having been printed. It is consequently highly likely that a long period has elapsed since the last printing action. When the ink jet heads 1 are not used for a long period, the viscosity of the ink increases within the ink flow channels (and particularly within the nozzles) of the ink jet heads 1. Printing quality deteriorates when printing is performed using viscous ink. Further, the nozzles may become blocked and discharge ink in an inadequate manner. Flushing is executed in order to solve this problem. Flushing refers to discharging ink from each of the ink jet heads 1*a* to 1*d*. The viscous ink is thus discharged.

In the process of S3, the flushing control circuit 87 controls the motor driving circuit 96 via the selector 89. The motor driving circuit 96 thus causes the transportation belt 108 to rotate to a position where the recess 102 (see FIG. 1) is facing the ink discharging face 2*a* of the ink jet head 1*a*. Next, the flushing control circuit 87 controls the head driving circuit 95 via the selector 88. The head driving circuit 95 thus drives the ink jet head 1*a* to discharge ink from all the nozzles. The recess 102 receives the ink that is discharged from the ink jet head 1*a*. Next, the transportation belt 108 is rotated until the recess 102 is facing the ink discharging face 2*b* of the ink jet head 1*b*. Ink is discharged from all the nozzles of the inkjet head 1*b*. Similarly, the ink jet head 1*c* discharges ink towards the recess 102, and the ink jet head 1*d* also discharges ink towards the recess 102. In the present representative embodiment, flushing is performed of all the ink jet heads 1*a* to 1*d*. However, in the case where printing of a single color (black, for example) is executed, flushing may be performed of only the ink jet head that is being used.

In the process of S3, the printing paper is fed along the transportation path 200 when the flushing action has been executed. This process is executed by means of the controller 60 driving a motor connected with the rollers 105*a* and 105*b* (see FIG. 1). The printing paper is thus positioned facing the ink discharging face 2*a* of the ink jet head 1*a*. In this state, the printing paper is not facing the ink discharging faces 2*b* to 2*d*.

In the process of S3, the timer 85 starts at the time when the flushing action terminates. This process is executed by the reset signal output section 63. The reset signal output section 63 outputs a signal to the timer 85. When the timer 85 receives the signal, the timer 85 starts.

When S3 has been terminated, the process proceeds to S4. The process also proceeds to S4 in the case where YES was determined in S2. In S4, it is determined whether the print data corresponding to ten lines of printing has been received. This process is executed by the data amount determination section 61. The process of S4 repeats in the case where the received print data is less than ten lines of printing.

When it is determined that ten lines of print data have been received (YES in S4), the process proceeds to S5. In S5, it is determined whether the measured value (t) measured by the timer 85 has reached a predetermined time period (T). This process is executed by the selectors 88 and 89. In the case where the value measured by the timer 85 has not reached the predetermined time, the process proceeds to S6. In the case where the value measured by the timer 85 has reached the predetermined time, the process proceeds to S11.

The printing action is executed in S6. The head control section 64 controls the head driving circuit 95 via the selector 88. The head driving circuit 95 drives the ink jet heads 1*a* to 1*d*. Ink is discharged from the ink jet heads 1*a* to 1*d*.

In the case where, for example, the first ten lines (line 1 to line 10) of the printing paper are facing the ink discharging face 2*a*, cyan ink is discharged from the ink discharging face 2*a* towards the portion of the printing paper corresponding to the first ten lines. In S6, in the case where the first ten lines of the printing paper are facing the ink discharging face 2*a*, these first ten lines are printed only with cyan ink and, because the printing paper is not facing the ink discharging faces 2*b* to 2*d*, these ten lines are not printed with any other ink.

When this printing action has terminated, the transportation control section 65 controls the motor driving circuit 96 via the selector 89. The motor driving circuit 96 drives the motor 142, and the printing paper is thus transported for a distance corresponding to ten lines of printing. In the case where, for example, the first ten lines of the printing paper were facing the ink discharging face 2*a*, the printing paper is transported until the first ten lines are facing the ink discharging face 2*b*. At this juncture, a portion of the printing paper corresponding to line 11 to line 20 is facing the ink discharging face 2*a*.

When the printing action has terminated, the reset signal output section 63 outputs the reset signal to the timer 85. The value measured by the timer 85 thus returns to zero, and the timer 85 is restarted.

In S6, in the case where a portion of the printing paper corresponding to line 11 to line 20 is facing the ink discharging face 2*a*, the ink discharging face 2*a* discharges cyan ink towards the portion of the printing paper corresponding to line 11 to line 20. At the same time, the ink discharging face 2*b* discharges magenta ink towards the portion of the printing paper corresponding to the first ten lines.

In the case where a portion of the printing paper corresponding to line 21 to line 30 is facing the ink discharging face 2*a*, the ink discharging face 2*a* discharges cyan ink towards the portion of the printing paper corresponding to line 21 to line 30. At the same time, the ink discharging face 2*b* discharges magenta ink towards the portion of the printing paper corresponding to line 11 to line 20. The ink discharging face 2*c* discharges yellow ink towards the portion of the printing paper corresponding to the first ten lines.

In the case where a portion of the printing paper corresponding to line 31 to line 40 is facing the ink discharging face 2*a*, the ink discharging face 2*a* discharges cyan ink towards the portion of the printing paper corresponding to line 31 to line 40. The ink discharging face 2*b* discharges magenta ink towards the portion of the printing paper corresponding to line 21 to line 30. The ink discharging face 2*c* discharges yellow ink towards the portion of the printing paper corresponding to line 11 to line 20. The ink discharging face 2*d* discharges black ink towards the portion of the printing paper corresponding to the first ten lines.

Four color printing has thus been performed of the first ten lines of the printing paper. Color printing is performed on the fifty lines of the printing paper by executing the process of S6 with respect to the following groups of ten lines.

When S6 has been completed, the process proceeds to S7. In S7, it is determined whether the printing of fifty lines (one page of printing paper) has been completed. This process is executed by the print termination determination section 66.

The print termination determination section 66 is provided with a counter that counts, for example, the number of times that ten lines have been completed. It can be determined whether the printing of fifty lines has been completed by reading the count value of the counter.

When fifty lines have been printed, the process proceeds to S8. In S8, the printing page is ejected to the paper ejection part 112. This process is executed by the transportation control section 65 controlling the motor driving circuit 96 via the selector 89. Furthermore, in S8, the print data is deleted that corresponds to fifty lines and is being stored in the image memory 86. This process is executed by the data deletion section 67.

In the case where the printing of the fifty lines has not been completed (NO in S7), the process returns to S4. Thereupon, it is determined whether the print data of the next ten lines of print data has been received.

Next, the process of S11 will be described. The process of S11 is executed in the case where it was determined in S5 that the value measured by the timer 85 has reached the predetermined time.

Figure 7:
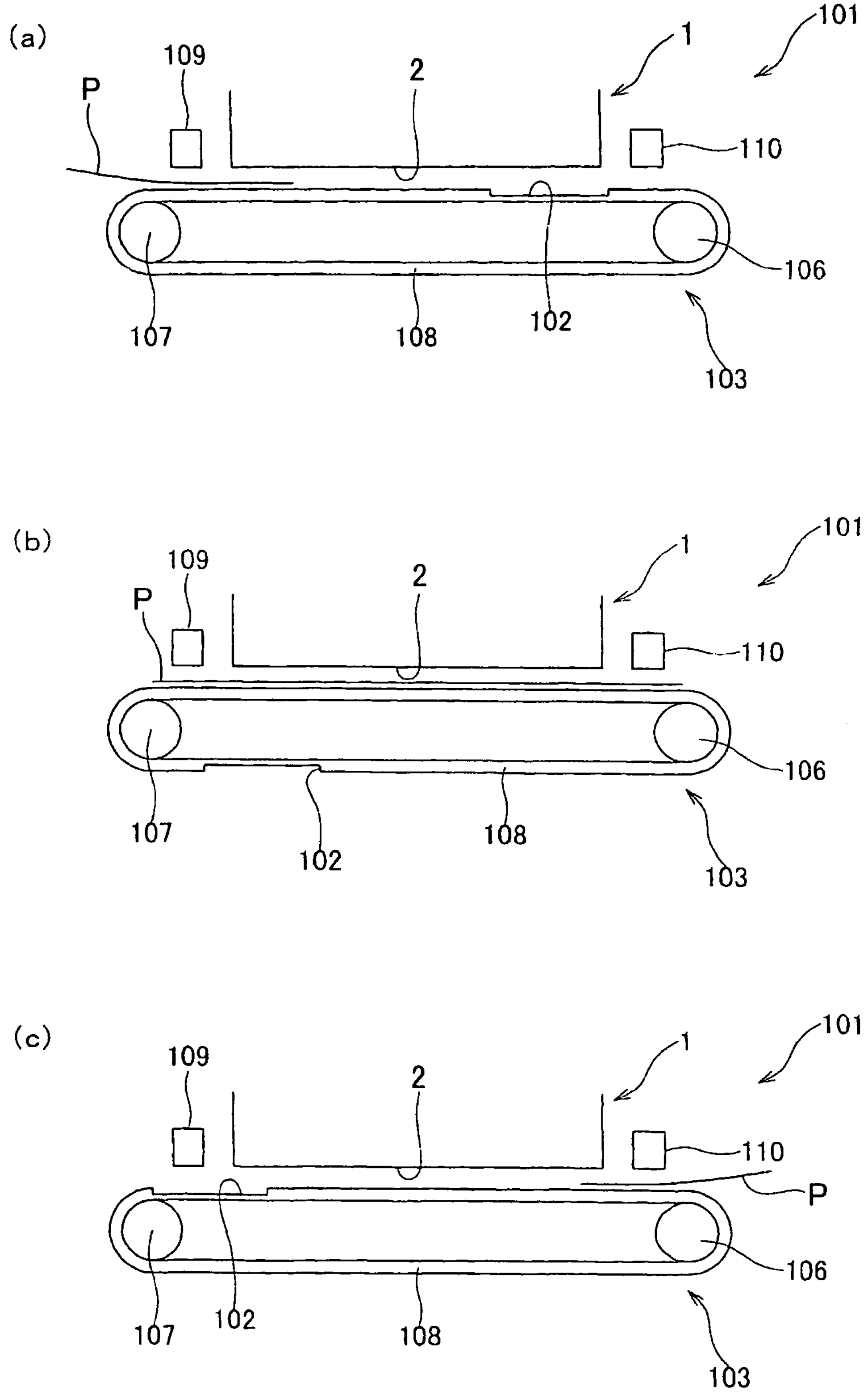
FIG. 7 shows figures for describing positions of printing paper.

FIG. 7 shows positional relationships between the ink jet head 1 and the printing paper P. In FIG. 7, the four ink jet heads 1*a* to 1*d* are not shown separately, but are instead shown jointly as a single member.

FIG. 7 (*a*) shows a state where the anterior end of the printing paper P has passed the positioning sensor 109 and has not passed the positioning sensor 110 (i.e. the first position). FIG. 7 (*b*) shows a state where the printing paper P is facing the entirety of the ink discharging face 2 (i.e. the second position). FIG. 7 (*c*) shows a state where a posterior end of the printing paper P has passed the positioning sensor 109 and has not passed the positioning sensor 110 (i.e. the third position).

In S11, the positioning determination section 62 determines, based on the results detected by the positioning sensors 109 and 110, whether the printing paper P is in the first, second, or third position (see FIGS. 7 (*a*) to (*c*)). In the case where it is determined that the printing paper P is in the first position (FIG. 7 (*a*)), the process proceeds to S12. In S12, the flushing control circuit 87 controls the motor driving circuit 96 via the selector 89. The printing paper P is thus transported to the second position.

When S12 is completed, the process proceeds to S13. Furthermore, when it was determined that the printing paper P is in the second position (FIG. 7 (*b*)), also, the process proceeds to S13. The flushing action is performed in S13. The flushing control circuit 87 controls the head driving circuit 95 via the selector 88. Since the printing paper P is the second position, ink is discharged towards the printing paper. In S13, ink is discharged simultaneously from all the nozzles of the ink jet heads 1*a* to 1*d*. The flushing action can thus be performed within a short period. By performing the flushing action onto the printing paper as in S13, it is possible to reduce the number of times that the flushing action is performed onto the recess 102 of the transportation belt 108. The recess 102 of the belt 108 can therefore be cleaned less frequently.

When S13 is completed, the process proceeds to S14. In S14, the printing paper that has received the flushed ink is ejected. The transportation control section 65 controls the motor driving circuit 96 via the selector 89. The motor 142 thus rotates, and the printing paper is ejected.

In the case where it is determined in S11 that the printing paper is in the third position (see FIG. 7 (*c*)), the process proceeds to S15. In S15, the printing paper is ejected to the paper ejection part 112. The transportation control section 65 controls the motor driving circuit 96 via the selector 89. The motor 142 therefore rotates, and the printing paper is ejected.

When S15 has been completed, the process proceeds to S16. Further, when S14 has been completed, S16 is skipped and the process proceeds to S17.

In S16, the flushing action is performed of all the ink jet heads 1*a* to 1*d*. In S16, the ink is discharged onto the recess 102 of the transportation belt 108. This occurs because the printing paper that was in the third position in S11 was not facing all of the ink discharging faces 2*a* to 2*d* in S16.

In S17, new printing paper is supplied into the transportation path 200. This process is executed by means of the controller 60 driving the motor connected with the rollers 105*a* and 105*b*. In S18, the new printing paper is printed. In S18, all of the print data stored in the image memory 86 is printed. In S18, the head control section 64 controls the head driving circuit 95 via the selector 88, and the transportation control section 65 controls the motor driving circuit 96 via the selector 89. When printing has been completed, the reset signal output section 63 outputs the reset signal. The timer 85 is thus reset, and is restarted. The process proceeds to S7.

Figure 6:
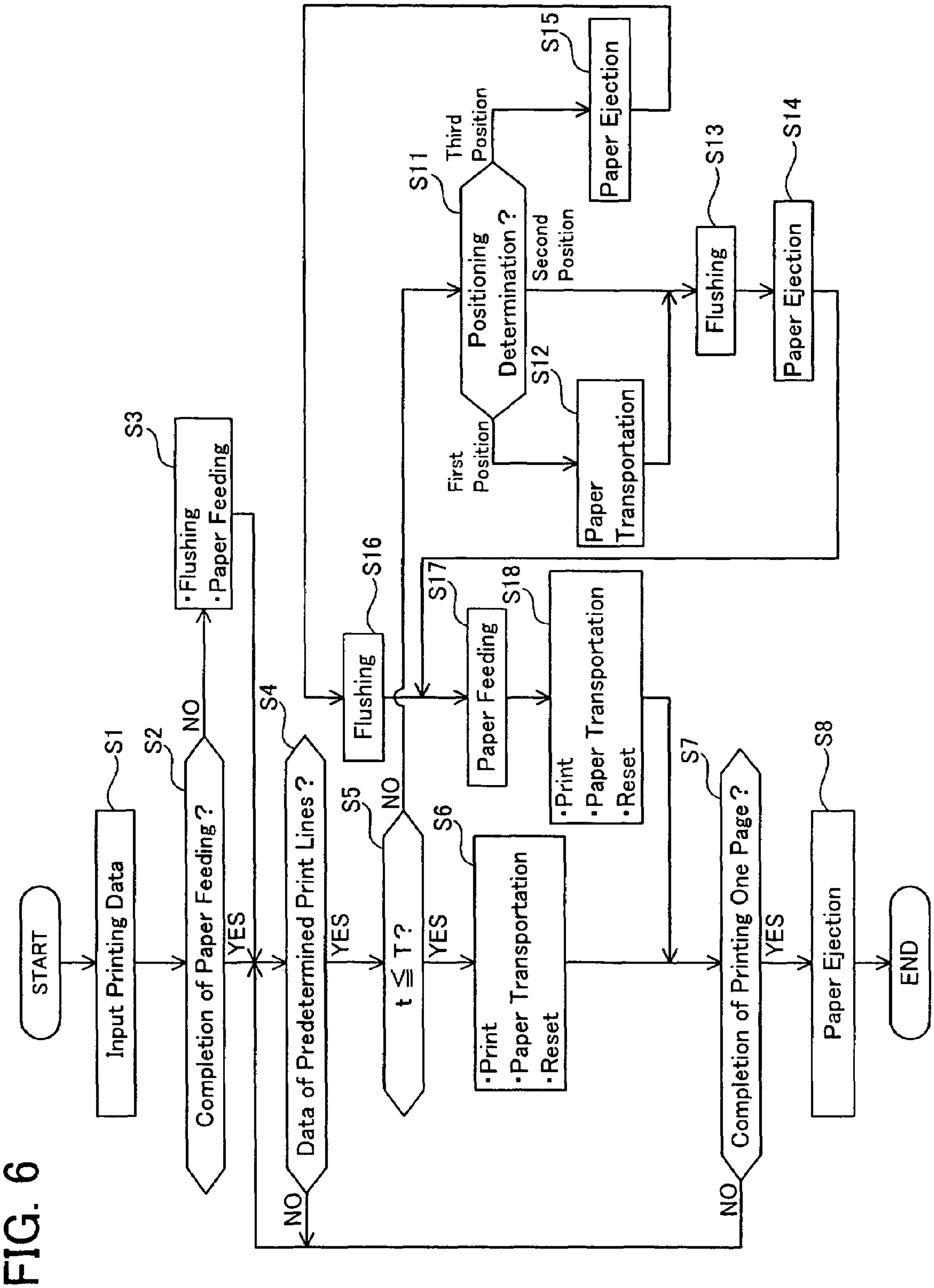
FIG. 6 shows a flow chart showing operation of the ink jet printer.
Figure 8:
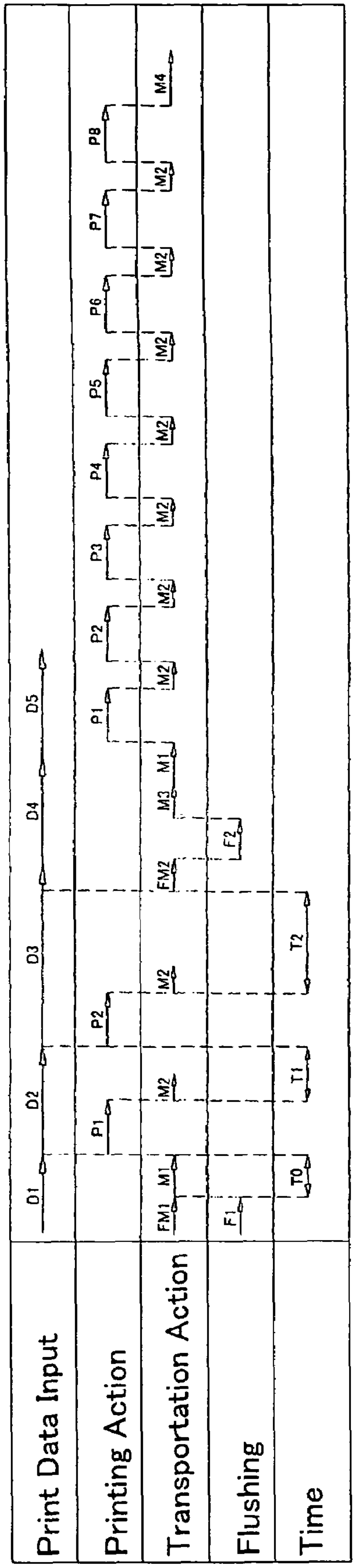
FIG. 8 shows a time chart of a printing action.

FIG. 8 is an example of a time chart in the case where the flow chart of FIG. 6 is executed. FIG. 8 shows the following items: the print data input, printing action, transportation action, flushing, and time. The description is given for the case where one print data file contains print data corresponding to fifty lines (one page).

The first ten lines of print data D1, out of the fifty lines of print data output from the PC 90, are received by the communication processing section 91. When reception of the print data D1 begins, a control signal is output from the main control section 60*a* to the flushing control circuit 87. The flushing control circuit 87 drives the motor driving circuit 96. The motor driving circuit 96 causes the motor 142 to rotate. The transportation belt 108 executes a transportation action FM1 so that the recess 102 of the transportation belt 108 is sequentially located so as to face the ink discharging faces 2*a* to 2*d* of the ink jet heads 1*a* to 1*d*. The flushing control circuit 87 drives the head driving circuit 95. When the ink discharging face 2*a* is facing the recess 102, ink is discharged from the ink discharging face 2*a*. Similarly, ink is discharged sequentially from the ink discharging faces 2*b* to 2*d* when these are facing the recess 102. A flushing action F1 is thus executed.

At the time the flushing action F1 terminates, a transportation action M1 to supply the printing paper is performed within the transportation path 200. This transportation action M1 is executed by driving the motor connected with the rollers 105*a* and 105*b*. Furthermore, at the time the flushing action F1 terminates, the timer 85 begins measurement (T0).

The data amount determination section 61 determines that the first ten lines of print data D1 have been received. At this juncture, the measured time T0 is compared with the predetermined time T (see S5 of FIG. 6). In the present representative embodiment, T0 is smaller than T. The head control section 64 controls the head driving circuit 95, thus performing a printing action P1 in which the inkjet head 1*a* prints the print data D1. When the printing action P1 terminates, the transportation control section 65 controls the motor driving circuit 96 to cause the motor 142 to rotate. A transportation action M2 is thus performed in which the printing paper is moved by an amount corresponding to ten lines.

Moreover, while P1 and M2 immediately after P1 are being executed, the communication processing section 91 receives print data D2. This print data D2 is the print data corresponding to line 11 to line 20. The timer 85 measures time T1 from the completion of the printing action P1.

The data amount determination section 61 determines that the print data D2 has been received. The measured time T1 is compared with the predetermined time T. In the present representative embodiment, T1 is smaller than T. The head control section 64 controls the head driving circuit 95, thus executing a printing action P2. The ink jet head 1*a* prints the portion of the printing paper corresponding to line 11 to line 20 based on the print data D2. The ink jet head 1*b* prints the portion of the printing paper corresponding to the first ten lines based on the print data D1.

When the printing action P2 terminates, the transportation control section 65 controls the motor driving circuit 96, thus causing the transportation motor 142 to rotate. The transportation action M2 is thus performed in which the printing paper is moved by an amount corresponding to ten lines. The portion corresponding to line 21 to line 30 is thus transported to a position facing the ink discharging face 2*a*.

Moreover, while P2 and M2 immediately after P2 are being executed, the communication processing section 91 receives print data D3. This print data D3 is the print data corresponding to line 21 to line 30. When the printing action P2 has been completed, the reset signal is output from the printing reset signal output section 63. The timer 85 is restarted. The timer 85 measures time T2.

When it takes a long time for the print data D3 to be received, the elapsed time T2 of the timer 85 exceeds the predetermined time T. In this case, the positioning determination section 62 determines the position of the printing paper based on the results detected by the positioning sensors 109 and 110 (S11 in FIG. 5). At this juncture, the portion of the printing paper corresponding to line 21 to line 30 is facing the ink discharging face 2*a*. That is, the portion of the printing paper corresponding to the first ten lines is facing the ink discharging face 2*c*. The anterior end of the printing paper has thus not reached the positioning sensor 110, and the positioning determination section 62 determines that the printing paper is in the first position. The printing paper is then transported (see S12 of FIG. 5). This process is executed by the flushing control circuit 87 controlling the motor driving circuit 96. The printing paper is transported to the second position (transportation action FM2). While the transportation action FM2 is being performed, the communication processing section 91 receives print data D4. In the present representative embodiment, the print data D4 is the print data corresponding to line 31 to line 40.

When the transportation action FM2 has been completed, the flushing control circuit 87 controls the head driving circuit 95. Ink is thus discharged towards the printing paper from the ink jet heads 1*a* to 1*d* (flushing action F2).

When the flushing action F2 has been completed, the transportation control section 65 controls the motor driving circuit 96. The transportation motor 142 therefore rotates. The printing paper onto which ink has been discharged is ejected to the paper ejection part 112 (transportation action M3). Next, the transportation control section 65 controls the motor driving circuit 96 and a new printing paper is supplied (transportation action M1). Furthermore, the communication processing section 91 receives the print data D4 and D5 while FM2, F2, M3, and M1 are being executed. D5 is the print data corresponding to line 41 to line 50.

The reception of the print data D1 to D4 is completed while the transportation action M1 immediately after the transportation action M3 is being executed. The print data D1 to D4 has been stored in the image memory 86. The printing of the print data D1 to D4 can thus be executed.

First, the printing action P1 of the print data D1 is executed. Then, the transportation action M2 is performed in which the printing paper is moved by an amount corresponding to ten lines.

Then, the printing action P2 in which the ink jet head 1*a* prints the portion of the printing paper corresponding to line 11 to line 20 based on the print data D2 is executed. In P2, the ink jet head 1*b* prints the portion of the printing paper corresponding to first ten lines based on the print data D1. Then, the transportation action M2 is performed in which the printing paper is moved by an amount corresponding to ten lines.

Next, the printing action P3 is executed. In P3, the ink jet head 1*a* prints the portion of the printing paper corresponding to line 21 to line 30 based on the print data D3. The ink jet head 1*b* prints the portion of the printing paper corresponding to line 11 to line 20 based on the print data D2. The ink jet head 1*c* prints the portion of the printing paper corresponding to first ten lines based on the print data D1. Then, the transportation action M2 is performed in which the printing paper is moved by an amount corresponding to ten lines.

Next, the printing action P4 is executed. In P4, the ink jet head 1*a* prints the portion of the printing paper corresponding to line 31 to line 40 based on the print data D4. The ink jet head 1*b* prints the portion of the printing paper corresponding to line 21 to line 30 based on the print data D3. The ink jet head 1*c* prints the portion of the printing paper corresponding to line 11 to line 20 based on the print data D2. The ink jet head 1*d* prints the portion of the printing paper corresponding to first ten lines based on the print data D1. Then, the transportation action M2 is performed in which the printing paper is moved by an amount corresponding to ten lines.

The determination whether the predetermined time has elapsed is not performed while these printing actions P1 to P4 are being performed. When the printing actions P1 to P4 has been completed, the portion of the printing paper corresponding to first ten lines has been full color printed.

The reception of the print data D5 had already been completed when the printing action P4 was completed. Therefore, the printing action P5 of the print data D5 is executed immediately after the completion of the transportation action M2 that followed the printing action P4. In P5, the ink jet head 1*a* prints the portion of the printing paper corresponding to line 41 to line 50 based on the print data D5. The ink jet head 1*b* prints the portion of the printing paper corresponding to line 31 to line 40 based on the print data D4. The ink jet head 1*c* prints the portion of the printing paper corresponding to line 21 to line 30 based on the print data D3. The ink jet head 1*d* prints the portion of the printing paper corresponding to line 11 to line 20 based on the print data D2. When the printing actions P5 has been completed, the portion of the printing paper corresponding to line 1 to line 20 has been full color printed. Then, the transportation action M2 is performed.

Next, the printing action P6 is executed. In P6, the ink jet head 1*b* prints the portion of the printing paper corresponding to line 41 to line 50 based on the print data D5. The ink jet head 1*c* prints the portion of the printing paper corresponding to line 31 to line 40 based on the print data D4. The ink jet head 1*d* prints the portion of the printing paper corresponding to line 21 to line 30 based on the print data D3. When the printing actions P6 has been completed, the portion of the printing paper corresponding to line 1 to line 30 has been full color printed. Then, the transportation action M2 is performed.

Then the printing action P7 is performed. In P7, the ink jet head 1*c* prints the portion of the printing paper corresponding to line 41 to line 50 based on the print data D5. The ink jet head 1*d* prints the portion of the printing paper corresponding to line 31 to line 40 based on the print data D4. When the printing actions P7 has been completed, the portion of the printing paper corresponding to line 1 to line 40 has been full color printed. Then, the transportation action M2 is performed.

Finally, the printing action P8 is performed. In P8, the ink jet head 1*d* prints the portion of the printing paper corresponding to line 41 to line 50 based on the print data D5. When the printing actions P8 has been completed, the portion of the printing paper corresponding to line 1 to line 50 has been full color printed.

The printing actions P5 to P9 are executed based on the print data D2 to D5 which had been already received. Therefore, the determination whether the time measured by the timer 85 is within the predetermined time is not performed while printing actions P5 to P9 are being performed.

When the printing action P8 has been completed, the print termination determination section 66 determines that the printing of fifty lines of print data has been completed. The transportation control section 65 controls the motor driving circuit 96, and the motor 142 therefore rotates. A transportation action M4 is performed in which the printing paper is transported to the paper ejection part 112. Printing by the ink jet printer 101 is thus completed.

The ink jet printer 101 of the present representative embodiment has been described in detail. This ink jet printer 101 does not begin printing only after having received all the print data included in one print data file (this corresponding to fifty lines of printing in the present representative embodiment). Instead, the ink jet printer 101 begins printing after having received print data corresponding to ten lines of printing. As a result, the time required for printing can be reduced.

In conditions such as those shown in FIG. 8, for example, the flushing action is performed after printing has begun. It might seem that a longer time would be required for printing in this case. However, two rounds of the printing action P1 have been performed in FIG. 8 before all the print data D1 to D5 has been received. As a result, the time required for printing can be made shorter than in the case where printing begins only after all the print data D1 to D5 has been received.

In the present representative embodiment, the printing action is not restarted of a partially printed printing paper in the case where a predetermined amount of print data cannot be received within the predetermined time period (T). Printing that has variations in printing quality can thus be prevented.

When printing will not be restarted, the positioning determination section 62 determines the position of the printing paper based on the results detected by the positioning sensors 109 and 110. When the printing paper is in the first or the second position, the flushing action is performed in which ink is discharged toward the printing paper. It is thus possible to reduce the number of times that the flushing action is performed onto the recess 102 of the transportation belt 108, and the transportation belt 108 therefore requires less frequent cleaning.

When the printing paper is in the third position, the partially printed printing paper is ejected. The ink is discharged toward the transportation belt 108.

The flushing action prevents printing in which viscous ink is discharged. Furthermore, the flushing action prevents the ink from being discharged in an inadequate manner. A deterioration in printing quality can thus be prevented.

Printing is performed on new printing paper when the flushing action has been completed. As a result, high quality printing can be executed.

All of the print data within one print data file is stored in the image memory 86 until all of this print data has been printed. As a result, printing can be restarted without having to receive the print data once again in the case where flushing was performed part way through the printing action. The time required for printing can therefore be reduced.

The embodiment described above merely illustrates some possibilities of the invention and does not restrict the claims thereof. The art set forth in the claims encompasses various transformations and modifications to the embodiment described above. Representative transformations are shown below.

(1) In the example of FIG. 8, it has been presupposed that an identical amount of data is present for each of the ten lines of print data D1 to D5. However, there may equally well be differing amounts of data for each of the ten lines of print data D1 to D5. Furthermore, the amount of data for the print data D1 to D5 may be an amount other than ten lines. For example, an amount of data greater than ten lines (such as 25 lines for example) may be used. An amount of data exceeding one printing page (such as 75 lines for example) may be used. An amount of data less than ten lines (such as one line for example) may also be used. The amount of data (D1 to D5) may be set according to the number of lines that have been set for one printing page.

Generally, the print data is rasterized and is output from the PC. However, the technique of the present representative embodiment can also be applied to cases where text data and/or vector data is output.

(2) The amount of data for the print data D1 to D5 may be varied. For example, the amount of data for the print data D1 may be five lines, and the amount of data for the print data D2 may be ten lines.

In this case, the distance that the printing paper is transported is not constant. Instead, this transportation distance may be found based on address information (data showing the position on the printing paper of the letters or images to be printed) or the like included in the print data that is received.

(3) An end flag may be inserted into an end part of each item of print data D1 to D5 so that it can be determined whether the reception of each item of print data D1 to D5 has been completed. Furthermore, in the case where the number of bits in the print data D1 to D5 is known, the completion of reception may be determined by comparing the actual number of bits that have been received with the known number of bits.

(4) In the aforementioned representative embodiment, the ink jet heads 1*a* to 1*d* are fixed. That is, the present representative embodiment has line type ink jet beads. However, movable (serial type) ink jet heads may equally well be used. If serial type ink jet heads are used, the ink jet heads may be moved during the flushing action.

(5) The position detecting step performed by the positioning sensors 109 and 110, etc. may be omitted. The positioning determination section 62 may also be omitted. In this case, the printing paper is ejected, irrespective of position, when it is determined that the value measured by the timer 85 has exceeded the predetermined time period. Ink is then discharged towards the transportation belt 108.

(6) In the ink jet printer 101, the printing paper is transported by means of the transportation belt 108 and the two rollers 106 and 107. However, a configuration may equally well be used in which a plurality of rollers is aligned with virtually no space therebetween in the direction of transportation of the printing paper. In this case, the transportation belt 108 can be omitted.

(7) In the aforementioned representative embodiment, the recess 102 is formed in the transportation belt 108. Instead, a transportation belt 108 may be used that has an ink absorbing material such as sponge, etc.

Further, in the case where an ink jet printer has a member for receiving the ink from the flushing action (a receiving pan or the like that is inserted between the ink jet heads 1 and the printing paper when the flushing action is performed), the recess 102 of the transportation belt 108 does not need to be provided.

In this case, it is not necessary for the print data within one print data file to be stored in the image memory 86 until all of this print data has been printed. The image memory 86 may therefore be omitted.

(8) The ink discharging capacity of the ink jet heads may equally well be restored using a method other than flushing. For example, a device may be used that covers the nozzles of the ink jet heads and generates negative pressure. If this device is used, the viscous ink can be sucked out from the nozzles.

(9) A configuration may also be used in which the motor 142 (see FIG. 5) can cause inverse rotation of the roller 106 (leftwards rotation with respect to FIG. 1). That is, a mechanism may also be provided that can transport the printing paper from downstream to upstream. In this case, the printing paper that is in the third position can be returned to the second position. The flushing action can therefore be performed onto the printing paper that had been in the third position.

If the ink jet head is not used for a long time, ink within an ink flow channel (particularly within nozzles) of the ink jet head becomes viscous. Printing quality may deteriorate when viscous ink is discharged. Further, the nozzles may be blocked by viscous ink. In order to solve this problem, it is preferred that the controller performs the following operations.

It is preferred that the controller controls the ink jet head to execute a flushing action in the case where the time since the last printing action has exceeded a predetermined time. The flushing action is an action wherein the ink jet head discharges ink so as to recover an ink discharging ability of the ink jet head.

It is preferred the flushing action is executed not based on the print data.

The viscous ink is discharged by means of the flushing action. It is thus possible to prevent the viscous ink from being discharged onto a new print medium that is being printed. High printing quality printing can thus be achieved.

In the case where the ink jet printer has finished receiving the predetermined amount of print data within a predetermined time since the last printing action, the controller may control the ink jet head to execute the printing action against the print medium that has been partially printed.

In the case where the ink jet printer finishes receiving the print data within the predetermined time, high printing quality printing can be continued.

The ink jet printer may have a position sensor that detects a position of the partially printed print medium. (1) If the position of the print medium is a facing position at which all ink discharge nozzles of the ink jet head are facing the print medium or (2) if the position of the print medium is upstream from the facing position and only some of the ink discharge nozzles are facing the print medium, the controller may control the ink jet head to execute the flushing action by discharging ink toward the partially printed print medium, and the controller controls the transportation device to eject the print medium after the flushing action. (3) If the position of the print medium is downstream from the facing position and only some of the ink discharge nozzles are facing the print medium, the controller may control the ink jet head to execute the flushing action by discharging ink toward the transportation device after the partially printed print medium has been ejected.

In the case of (1) and (2) above, flushing is performed by discharging ink toward the partially printed print medium. In the case of (3) above, flushing is performed by discharging ink toward the transportation device.

According to these forms, there is no need for a special device for receiving the flushed ink. Flushing can be executed using the structure required by the normal ink jet printer. Since flushing can, according to circumstances, be performed by discharging the ink toward the print medium, it is possible to reduce the number of times in which ink is discharged toward the transportation device. The transportation device therefore requires less frequent cleaning.

The ink jet printer may have a memory that stores the print data that was output from the external device. The controller may delete all the print data included in the print data file from the memory when all the print data included in the print data file has been printed.

In the case where the time since the last printing action has exceeded the predetermined time, the controller may control the ink jet head to execute the printing action, based on the print data that has been stored in the memory, onto a new print medium.

After the partially printed print medium has been ejected, printing of a new print medium can be performed once again. Since the print data is stored in the print data file, it is not necessary to receive the print data once more. Printing can therefore be completed within a short period.

With the above ink jet printer, there is no need to move the ink jet head itself to perform the flushing action. The ink jet head in a line printer is comparatively large and, as a result, it is not easy to move the ink jet head. The technique of the present invention is therefore suitable for a line printer.

An ink jet printer may also be provided that has an ink jet head and a controller. The ink jet head may execute the printing action in which it discharges ink toward the print medium. The ink jet head may execute a flushing action in which it discharges ink to recover an ink discharging ability of the ink jet head. The controller may control the ink jet head to execute the printing action when the ink jet printer has finished receiving a predetermined amount of print data, and may control the ink jet head to execute the flushing action to discharge ink toward a partially printed print medium in a case where time since a last printing action has exceeded a predetermined time.

A method for controlling the ink jet printer can also be taught.

This method may include a step of preventing the ink jet printer from executing the printing action against a partially printed print medium in a case where a time since a last printing action has exceeded a predetermined time. Furthermore, the method may include a step of controlling the ink jet printer to eject the partially printed print medium.

With this method, when printing of the partially printed print medium has not been executed for a long time, this print medium is not printed further, and instead the print medium is ejected. As a result, unsightly printing can be prevented.

The method may further include a step of controlling the ink jet printer such that, in the case where the time since the last printing action has exceeded the predetermined time, the ink jet printer executes a flushing action in which ink is discharged so as to recover an ink discharging ability.

The viscous ink is discharged by the flushing action. It is thus possible to prevent the viscous ink from being discharged onto a new print medium that is being printed. High printing quality printing can thus be achieved.

The present technique can be expressed as a computer program product.

This computer program product may include instructions for causing the computer device to perform: a step of preventing the ink jet printer from executing the printing action against a partially printed print medium in a case where time since a last printing action has exceeded a predetermined time; and a step of controlling the ink jet printer to eject the partially printed print medium.

When printing of the partially printed print medium has not been executed for a long time, this program product prevents further printing of this print medium, and causes the print medium to be ejected. As a result, unsightly printing can be prevented.

The computer program product may further include instructions such that, in the case where the time since the last printing action has exceeded the predetermined time, the computer device is caused to perform a step of controlling the ink jet printer to execute a flushing action in which ink is discharged so as to recover an ink discharging ability.

The viscous ink is discharged by the flushing action. It is thus possible to prevent the viscous ink from being discharged onto a new print medium that is being printed. High printing quality printing can thus be achieved.

What is claimed is:

1. An ink jet printer executing a printing action against a print medium based on print data output from an external device capable of communicating with the ink jet printer, the ink jet printer comprising:

an ink jet head that executes the printing action in which ink is discharged toward the print medium;

a transportation device that transports the print medium; and a controller that controls the ink jet head to execute the printing action each time the ink jet printer has finished receiving one part print data that composes a part of print data for one page, wherein the print data for one page comprises a plurality of part print data, the controller determines, for each one part print data of the plurality of part print data, whether or not the one part print data has been completely received within a predetermined time since a last printing action based on another one part print data which had been previously received, wherein:

in a case where the controller determines that a particular one part print data has not been completely received within the predetermined time, the controller prevents the ink jet head from executing a printing action based on the particular one part print data against a partially printed print medium and controls the transportation device to eject the partially printed print medium, and in a case where the controller determines that the particular one part print data has been completely received within the predetermined time, the controller controls the ink jet head to execute the printing action based on the particular one page print data against the partially printed print medium.

2. The ink jet printer as in claim 1, wherein the part print data is part of print data included in one print data file.

3. The ink jet printer as in claim 2, wherein a predetermined amount of the part print data can be varied each time the ink jet printer receives the part print data.

4. The ink jet printer as in claim 2, wherein a predetermined amount of the part print data is fixed each time the ink jet printer receives the part print data.

5. The ink jet printer as in claim 2, further comprising:

a memory that stores the print data output from the external device, wherein the controller deletes from the memory all the print data included in the print data file after all the print data included in the print data file has been printed.

6. The ink jet printer as in claim 5, wherein, in the case where the time since the last printing action has exceeded the predetermined time, the controller controls the ink jet head to execute the printing action against a new print medium, this printing action being based on the print data stored in the memory.

7. The ink jet printer as in claim 1, wherein, in the case where a time since the last printing action has exceeded the predetermined time, the controller controls the ink jet head to execute a flushing action in which ink is discharged so as to recover an ink discharging ability of the ink jet head.

8. The ink jet printer as in claim 7, wherein the controller controls the ink jet head to execute the flushing action in which ink is discharged not based on the print data.

9. The ink jet printer as in claim 7, wherein the controller controls the ink jet head to execute the flushing action in which ink is discharged toward the partially printed print medium, and the controller controls the transportation device to eject the print medium after the flushing action.

10. The ink jet printer as in claim 7, wherein, after the partially printed print medium has been ejected, the controller controls the ink jet head to execute the flushing action in which ink is discharged toward the transportation device.

11. The ink jet printer as in claim 10, wherein the transportation device comprises a moving belt capable of making contact with the print medium, and the controller controls the ink jet head to execute the flushing action in which ink is discharged toward the moving belt.

12. The ink jet printer as in claim 7, further comprising;

a position sensor that detects a position of the partially printed print medium, wherein the controller controls the ink jet head to execute the flushing action in which ink is discharged toward the partially printed print medium, and controls the transportation device to eject the print medium after the flushing action in a case where the position of the print medium is a facing position at which all ink discharge nozzles of the ink jet head are facing the print medium, or in a case where the position of the print medium is upstream from the facing position and only some of ink discharge nozzles are facing the print medium, and the controller controls the ink jet head to execute the flushing action in which ink is discharged toward the transportation device after the partially printed print medium has been ejected in a case where the position of the print medium is downstream from the facing position and only some of the ink discharge nozzles face the print medium.

13. The ink jet printer as in claim 7, wherein the ink jet printer is a line type printer.

14. A method of controlling an ink jet printer executing a printing action against a print medium based on print data output from an external device capable of communicating with the ink jet printer, the method comprising:

a step of controlling the ink jet printer to execute the printing action when each time the ink jet printer has finished receiving one part print data that composes a part of print data for one page, wherein the print data for one page comprises a plurality of part print data;

a step of determining, for each one part print data of the plurality of part print data whether or not the one part print data has been completely received within a predetermined time since a last printing action based on another one part print data which had been previously received;

wherein the step of controlling the ink jet printer to execute the printing action includes:

a step of preventing the ink jet printer from executing a printing action against a partially printed print medium based on a particular one part print data in a case where the particular one part print data has not been completely received within the predetermined time and controlling the ink jet printer to eject the partially printed print medium; and a step of controlling the ink jet printer to execute the printing action based on the particular one part print data against the partially printed print medium in a case where the particular one part print data has been completely received within the predetermined time since the last printing action.

15. The method as in claim 14, further comprising;

a step of controlling the ink jet printer to execute a flushing action in which ink is discharged so as to recover an ink discharging ability in the case where the time since the last printing action has exceeded the predetermined time.

16. The method as in claim 15, wherein the part of print data is a part of print data included in one print data file, and a predetermined amount of the part print data can be varied each time the ink jet printer receives the part print data.

17. The method as in claim 15, wherein the part of print data is a part of print data included in one print data file, and a predetermined amount of the part print data is fixed each time the ink jet printer receives the part print data.

18. A computer program product that is executed by a computer device mounted on an ink jet printer executing a printing action against a print medium based on print data output from an external device capable of communicating with the ink jet printer, the computer program product including instructions for causing the computer device to perform:

a step of controlling the ink jet printer to execute the printing action each time the ink jet printer has finished receiving one part print data that composes a part of print data for one page, wherein the print data for one page comprises a plurality of part print data;

a step of determining, for each one part print data of the plurality of part print data whether or not the one part print data has been completely received within a predetermined time since a last printing action based on another one part print data which had been previously received;

wherein the step of controlling the ink jet printer to execute the printing action includes;

a step of preventing the ink jet printer from executing a printing action against a partially printed print medium based on a particular one part print data in a case where the particular one part print data has not been completely received within the predetermined time and controlling the ink jet printer to eject the partially printed print medium; and a step of controlling the ink jet printer to execute the printing action based on the particular one part print data against the partially printed print medium in a case where the particular one part print data has been completely received within the predetermined time since the last printing action.

19. The computer program product as in claim 18, including instructions for causing the computer device to further perform:

a step of controlling the ink jet printer to execute a flushing action in which ink is discharged so as to recover an ink discharging ability in the case where a time since the last printing action has exceeded the predetermined time.

20. The computer program product as in claim 19, wherein the part print data is a part of print data included in one print data file, and a predetermined amount of the part print data can be varied each time the ink jet printer receives the part print data.

21. The computer program product as in claim 19, wherein the part print data is a part of print data included in one print data file, and a predetermined amount of he part print data is fixed each time the ink jet printer receives the part print data.

* * * * *

UNITED STATES PATENT AND TRADEMARK OFFICE

CERTIFICATE OF CORRECTION

PATENT NO. : 7,677,684 B2
APPLICATION NO. : 11/167282
DATED : March 16, 2010
INVENTOR(S) : Koji Nakayama It is certified that error appears in the above-identified patent and that said Letters Patent is hereby corrected as shown below:

In Column 24, Claim 21, Line 47:
replace “he” with -- the --.

Signed and Sealed this

Seventh Day of September, 2010

David J. Kappos

*Director of the United States Patent and Trademark Office*